J. F. PETERS.
REACTANCE COIL.
APPLICATION FILED DEC. 2, 1915.
1,344,713.
Patented June 29, 1920.
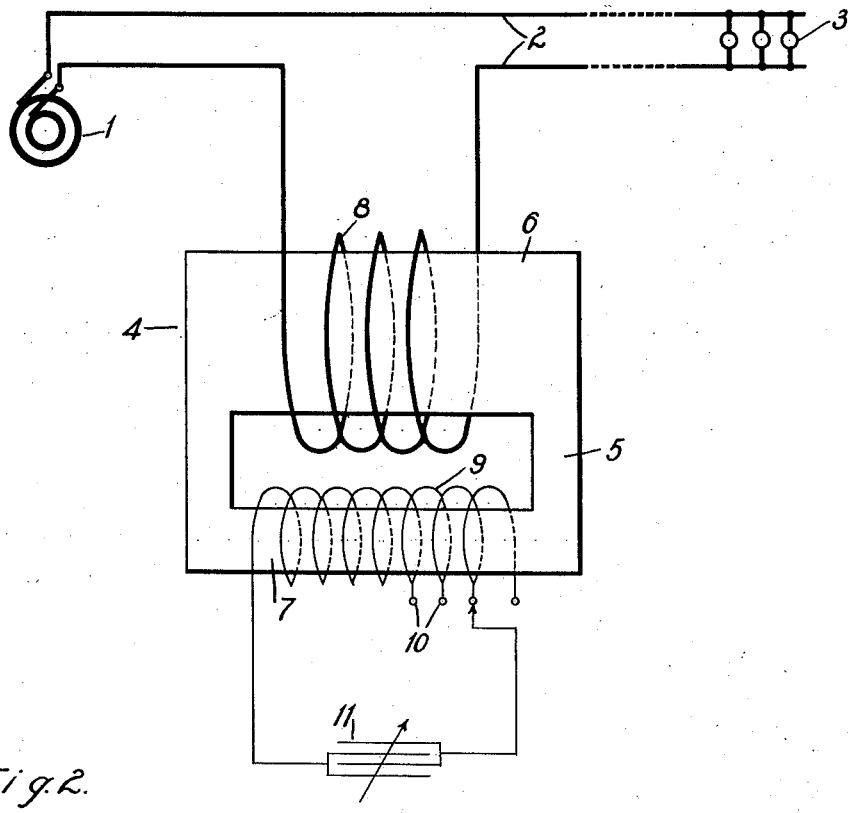
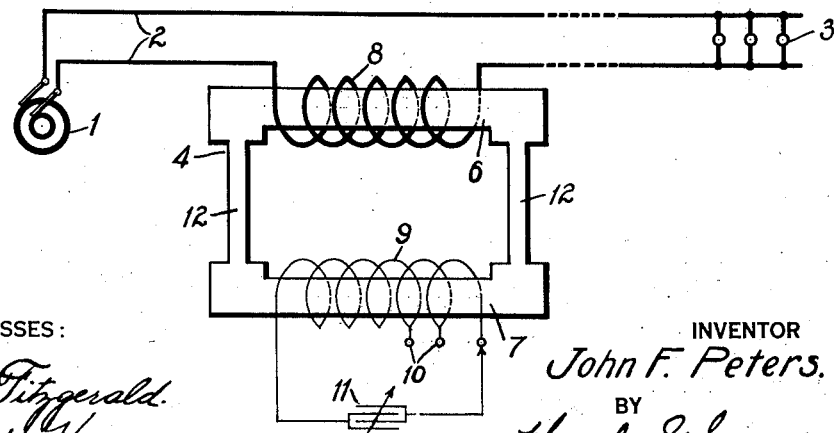
WITNESSES:
R. J. Fitzgerald.
Geo. W. Hansen.
INVENTOR
John F. Peters.
BY
Wesley G. Sloan
ATTORNEY

UNITED STATES PATENT OFFICE.

JOHN F. PETERS, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

REACTANCE-COIL.

1,344,713.  Specification of Letters Patent.  Patented June 29, 1920.

Application filed December 2, 1915. Serial No. 64,723.

*To all whom it may concern:*

Be it known that I, JOHN F. PETERS, a citizen of the United States, and a resident of Edgewood Park, in the county of Allegheny and State of Pennsylvania, have invented a new and useful Improvement in Reactance-Coils, of which the following is a specification.

My invention relates to power-limiting devices for electric power circuits, and it has special reference to reactance coils whereby short-circuit currents tending to flow over a power system, may be limited to such values as will not endanger the generating equipment or other apparatus connected in circuit.

More particularly, my invention relates to a power-limiting reactance coil that may be employed for adjusting or correcting the power-factor of a transmission system under certain predetermined load conditions and, at the same time, operate as a power-limiting device to preclude the flow of abnormally high currents when a short circuit occurs upon the system.

In distributing systems, it is usual to supply power-limiting reactance coils whereby the short-circuit currents may be limited to safe values in order to protect the generating equipment from the abnormal stresses and strains that result from the flow of excessively high currents. Power-limiting devices usually consist of reactance coils which are devoid of magnetizable core members, such coils, under normal load conditions, offering reactances that are relatively low, but, when short-circuit currents tend to flow over the system, they constitute current-limiting devices of relatively high impedance which prevent the short-circuit currents from reaching excessive values. Under all circumstances, however, current-limiting coils of the aforementioned character insert inductive reactances in transmission systems which may affect their regulation. Inasmuch as nearly all alternating-current power systems supply power to inductive loads, these reactance coils further reduce the power factors of the systems, thereby precluding the systems from operating at their highest efficiencies and under the most satisfactory power factors, unless other provisions are made, such as the employment of rotary condensers.

Since the usual power system comprises inductive loads, it is desirable to provide means, in combination with a power-limiting device, whereby the power factor of the system may be corrected or affected in such manner as to insure the economical operation of the system.

By means of my present invention, a power system may be protected against the flow of abnormally high short-circuit currents and, at the same time, when normal conditions obtain in the system, it may be economically operated, inasmuch as the power-factor thereof may be corrected or adjusted in such manner as to insure an efficient utilization of the electric power flowing in the system.

For a better understanding of the nature and scope of my invention, reference may be had to the following description and the accompanying drawing in which Figure 1 is a diagrammatic representation of an electric power system that is protected against the flow of abnormally high short-circuit currents by a power-limiting device embodying a form of my invention, and Fig. 2 is a modified form of the device of Fig. 1.

A source of power, shown as a single-phase alternator 1, is connected to mains 2 in order to furnish electric power to a load 3 which may be considered, in this particular instance, as an inductive load. In one of the mains 2, I insert a current-limiting device 4 whereby the alternator 1 may be protected from any short circuit that may develop in the system. If the alternator 1 is a high-speed and large-capacity unit having a low internal reactance, severe damage may result to it, on the occurrence of a short circuit, unless the short-circuit current is limited to a safe value by means of a power-limiting device such as is represented at 4.

In the present description, it will be assumed that the load 3 is an inductive load, thereby necessitating or making desirable that the power-factor of the system be corrected so that the system may be economically operated.

The current-limiting device 4 comprises a magnetizable core member 5 having a leg 6 of a relatively large cross-sectional area, and a second leg 7 of a relatively small cross-sectional area. A current-carrying coil 8 embraces the leg 6 and is connected in series-circuit relationship with one of the mains 2 of the power system. A second current-carrying coil 9, which may have a relatively larger number of turns than the coil 8, embraces the core leg 7 and is provided with taps 10 for adjusting purposes. A condensive reactance element 11, represented as an adjustable condenser, is connected in series with the coil 9. The capacity of the condenser 11 may be so adjusted as to establish either unity power-factor upon the power system or a slightly leading or lagging power-factor, as desired. This power-factor adjustment is effected by reason of the transference of the condensive reactance of the condenser 11 to the power system, since the coils 8 and 9 are closely mutually inductively related when normal currents flow in the power system.

The core legs 6 and 7 are so proportioned, by varying their cross-sectional areas, that the core leg 7 becomes magnetically saturated only when the current-flow in the power system exceeds a predetermined value which may be a value slightly in excess of full-load current. Under normal conditions, therefore, the coils 7 and 8 are closely mutually inductively related because of the small leakage flux emanating from the core member 5. When the current-flow through the coil 8 exceeds a predetermined value, such as will be occasioned when a short-circuit occurs upon the system, the core leg 7 becomes magnetically saturated and, therefore, the mutual inductance between the coils 8 and 9 decreases at a very rapid rate. Under this circumstance, the coil 8 constitutes a very high inductive reactance element that is connected in series with the alternator 1, since the core leg 6 does not become magnetically saturated. In other words, the coil 8 constitutes a purely inductive load of very high reactance which is effective in choking back or precluding the flow of abnormally high currents in the power system. The effect of the condensive reactance element 11 is so predominated by the inductive reactance of the coil 8 that the coil 9 may be considered as being magnetically insulated from the coil 8 because the mutual inductance between the coils is reduced to a negligible value. When the short circuit has been eliminated from the system and the current flowing from the alternator 1 is reduced to its normal value, the condensive reactance resulting from the condenser 11 is automatically re-inserted in circuit, whereby the power factor may be corrected, as explained above.

In the foregoing description, it is presumed that the load 3 is an inductive load and, in accordance therewith, the coil 9 is connected in closed circuit with the condensive reactance element 11, but, if the load 3 were a load requiring a leading current, the coil 9 should be connected in closed circuit with an inductive reactance element for correcting the power factor of the system. This is an obvious modification and will be apparent to those skilled in the art.

In Fig. 2, I have shown a modified form of the core member 5. In this instance, the cross-sectional area of the core leg 6 is equal to that of the core leg 7, but cross-arms 12, joining the core legs to each other, have decreased cross-sectional areas. The cross-arms 12 are so proportioned that they become magnetically saturated when the power currents flowing in the coil 8 exceed a predetermined value. As a result, the mutual inductance between the coils 8 and 9 is greatly decreased because of the increased leakage flux emanating from the reduced portions of the cross arms 12. Many other modifications in the structure of the magnetizable core member may be made, but it will be understood that I desire to maintain the coils 8 and 9 closely mutually inductively related under normal load conditions, but, when short circuits occur upon the system, the coils become magnetically separated from one another in order that the coil 8 may introduce a high impedance in the circuit to thereby limit the current flow.

While I have shown only two embodiments of my invention, other modifications may be made without departing from the spirit and scope thereof, and I desire, therefore, that only such limitations shall be imposed as are indicated in the appended claims.

I claim as my invention:

1. A current-limiting device comprising a magnetizable core member having a leg of relatively large cross-sectional area and another leg of relatively small cross-sectional area, a primary winding embracing said first leg, and a secondary winding embracing said second leg and connected in closed circuit, and an adjustable reactance element connected in series with the secondary winding whereby the power-factor of the circuit comprising the primary winding may be adjusted.

2. A power-limiting device comprising a magnetizable core member having two legs of different cross-sectional areas, current-carrying coils embracing said core legs, and a condensive reactance element connected in circuit with one of said coils to influence the conditions obtaining in the circuit of the other coil only when the current flowing in said second coil is below a predetermined value.

3. A power-limiting device comprising a magnetizable core member having two legs of different cross-sectional areas, a current-carrying winding embracing each of said core legs, the winding embracing the smaller of the two legs being connected in closed circuit, and said core legs being so proportioned that only the one having the smaller cross-sectional area becomes magnetically saturated when excessive currents flow through the winding surrounding the leg having the larger cross-sectional area, and an adjustable reactance element connected in series with the winding embracing said leg of smaller cross-sectional area.

4. A power-limiting device comprising a magnetizable core member having two legs of different cross-sectional areas, a current-carrying coil embracing each of said legs which are so proportioned that the one only having the smaller cross-sectional area becomes magnetically saturated when currents exceeding a predetermined value flow through the winding surrounding the leg having the larger cross-sectional area, and a condensive reactance element connected in shunt to the winding embracing said leg of smaller cross-sectional area.

5. A power-limiting device comprising a coil for the power currents, a second coil mutually inductively related thereto and connected in closed circuit, an adjustable reactance element connected in circuit with said second coil whereby the power factor of the circuit comprising said first coil may be adjusted when normal conditions obtain therein, and means whereby the mutual induction between said coils is caused to assume a substantially constant value when the power currents exceed a predetermined value.

6. In an electrical system, the combination with a line conductor, of a winding inserted therein, a second winding, means producing a magnetic path interlinking said two windings, and a capacitance connected in circuit with said second winding, said path approaching magnetic saturation at full-load current in said first mentioned winding, whereby if full-load current be radically exceeded, flux leakage is produced tending to neutralize the effect of said capacitance.

7. The combination with a line conductor, of a capacitance inductively related thereto through a magnetic path which is nearly saturated at full-load current in said conductor, whereby if said full-load current is radically exceeded, flux leakage is established producing inductive reactance tending to neutralize the effect of said capacitance.

8. The combination with a line conductor, of a capacitance inductively related thereto through a magnetic path which is nearly saturated at full-load current in said conductor, whereby if said full-load current is radically exceeded, flux leakage is established producing inductive reactance overcoming the effect of said capacitance and acting as a current-limiting device.

9. In an electrical system, the combination with a line conductor, of a winding inserted therein, a second winding, means producing a magnetic path interlinking said two windings, and an adjustable capacitance connected in circuit with said second winding, whereby the power factor of said system may be adjusted, said path approaching magnetic saturation at full-load current in said first mentioned winding, whereby if full-load current be radically exceeded, flux leakage is produced tending to neutralize the effect of said capacitance.

10. In an electrical system, the combination with a line conductor, of a winding inserted therein, a second winding, means producing a magnetic path interlinking said two windings, and an adjustable capacitance connected in circuit with said second winding, whereby the power factor of said system may be adjusted, said path approaching magnetic saturation at full-load current in said first mentioned winding, whereby if full-load current be radically exceeded, flux leakage is established, producing inductive reactance overcoming the effect of said capacitance and acting as a current-limiting device.

In testimony whereof I have hereunto subscribed my name this 27th day of Nov., 1915.

JOHN F. PETERS.